United States Patent
Heenan (10) Patent No.: US 8,044,998 B2
(45) Date of Patent: Oct. 25, 2011

(54) SENSING APPARATUS AND METHOD FOR VEHICLES

(75) Inventor: Adam John Heenan, Sheffield (GB)

(73) Assignee: TRW Limited, West Midlands (GB)

( * ) Notice: Subject to any disclaimer, the term of this patent is extended or adjusted under 35 U.S.C. 154(b) by 1230 days.

(21) Appl. No.: 11/786,771

(22) Filed: Apr. 12, 2007

(65) Prior Publication Data
US 2008/0036855 A1    Feb. 14, 2008

Related U.S. Application Data

(63) Continuation of application No. PCT/GB2005/003925, filed on Oct. 12, 2005.

(51) Int. Cl.
*H04N 7/18* (2006.01)
*G06F 15/16* (2006.01)

(52) U.S. Cl. .......................... 348/61; 348/118
(58) Field of Classification Search .............. 348/61, 348/113–118
See application file for complete search history.

(56) References Cited

U.S. PATENT DOCUMENTS

| | | | |
|---|---|---|---|
| 5,675,380 A | 10/1997 | Florent et al. | |
| 6,288,802 B1 * | 9/2001 | Hoshina et al. | 358/488 |
| 6,611,202 B2 * | 8/2003 | Schofield et al. | 340/461 |
| 2002/0130953 A1 | 9/2002 | Riconda et al. | |
| 2005/0240342 A1 * | 10/2005 | Ishihara et al. | 701/208 |
| 2006/0178830 A1 * | 8/2006 | Sherony | 701/301 |
| 2007/0042638 A1 * | 2/2007 | Choi | 439/541.5 |

FOREIGN PATENT DOCUMENTS

| | | |
|---|---|---|
| GB | 2 361 376 A | 10/2001 |
| JP | 08-096118 | 4/1996 |
| JP | 10-040499 | 2/1998 |

OTHER PUBLICATIONS

Line-Based Correction of Radial Lens Distortion by B. Prescott and G. F. McLean, Department of Mechanical Engineering, University of Victoria, Victoria, British Columbia, Canada; Graphical Models And Image Processing, vol. 59, No. 1, January, pp. 39-47, 1997, Article No. P960407.

Cucchiara, R. et al., "A Hough Transform-Based Method For Radial Lens Distortion Correction", Image Analysis And Processing, 2003. Proceedings. 12$^{th}$ Internatinoal Conference on Sep. 17-19, 2003, Piscataway, NJ, USA, IEEE, Sep. 17, 2003.

Prescott, B. et al., "Line-Based Correction Of Radial Lens Distortion", CVGIP Graphical Models And Image Processing, Academic Press, Duluth, MA, US, vol. 59, No. 1, Jan. 1997, pp. 39-47, XP004418948, ISSN: 1077-3169 abstract.

* cited by examiner

*Primary Examiner* — Zarni Maung
(74) *Attorney, Agent, or Firm* — MacMillan, Sobanski & Todd, LLC (57) ABSTRACT

A sensing apparatus for a host vehicle or the like, the apparatus comprises sensing means arranged to capture a first dataset of digital data comprising a set of data points representative of an image of a scene around the host vehicle, said image including at least one salient feature;
first data processing means arranged to identify a subset of the data points which correspond to the at least one salient feature, and second data processing means arranged to apply a transformation to the subset of data points to produce a processed subset which corresponds to a digital image of the salient features in the scene that has been corrected for at least one type of distortion in the image.

7 Claims, 8 Drawing Sheets

SENSING APPARATUS AND METHOD FOR VEHICLES

CROSS-REFERENCE TO RELATED APPLICATIONS

This application is a continuation of International Application No. PCT/GB2005/003925 filed Oct. 12, 2005, the disclosures of which are incorporated herein by reference, nd which claimed priority to Great Britain Patent Application No. 0422585.0 filed Oct. 12, 2004.

BACKGROUND OF THE INVENTION

This invention relates to improvements in sensing apparatus and methods of sensing which is in particular suitable for vehicles. It especially but not exclusively relates to an image detection apparatus which forms part of a lane boundary detection apparatus for a host vehicle that is adapted to estimate the location of the boundaries of a highway upon which the host vehicle is located. In a further aspect the invention provides a lane departure warning system which incorporates such apparatus.

In recent years the introduction of improved sensors and increases in processing power have led to considerable improvements in image recognition. These systems have fallen in cost and as such are now increasingly find application as part of automotive control systems. They are also suitable for marine, tracked vehicle and aerospace environments. Improvements in vehicle safety have driven these developments which are approaching commercial acceptance. One example of the latest advances is the provision of a lane departure warning system (LDW).

Current LDW systems are structured around position sensors which detect the presence of other vehicles and obstacles which are positioned on the road ahead of the host vehicle. They also need to detect the boundaries of the highway to enable the system to keep the vehicle within its lane. This is especially important when the vehicle is on an empty highway as it is not then possible to follow a preceding vehicle. In any event, it is important when following a vehicle to also detect the lanes to ensure that an error made by a preceding vehicle veering off course is not blindly followed by the host vehicle.

BRIEF SUMMARY OF THE INVENTION

The detection is typically performed using one or more video, radar or lidar based sensors mounted at the front of the host vehicle. The sensors identify the location of detected objects relative to the host vehicle and feed information to a processor. The processor determines where the boundaries are by identifying artefacts in the image.

A first aspect of the invention provides a sensing apparatus for a host vehicle or the like, the apparatus comprising:
sensing means arranged to capture a first dataset of digital data comprising a set of data points representative of an image of a scene around the host vehicle, said image including at least one salient feature;
first data processing means arranged to identify a subset of the data points which correspond to the at least one salient feature; and
second data processing means arranged to apply a transformation to the subset of data points to produce a processed subset which corresponds to a digital image of the salient features in the scene that has been corrected for at least one type of distortion in the image.

The apparatus of the invention at least partially removes distortion that may be present in images of a scene captured by the sensing means which removes errors in the position of key feature points that would normally be present. This can, in some arrangements, provide significant advantages. For example, where the apparatus comprises a lane detection apparatus for a vehicle it can provide for increased accuracy of detection of lane boundaries and the like. Because only extracted feature points are processed to remove distortion the processing overheads are lower than required to remove distortion from an entire captured image of raw data points. This allows lenses or other focusing methods to be used with distortion to give accurate position of features.

The apparatus may be adapted to produce a subset of data points which only correspond to salient features and nothing else. Because this does not transform the points which do not relate to salient features no processing power is wasted during the transform on features which are irrelevant.

By salient features we mean those features which may be or are subsequently used in a later image processing stage to identify lane boundaries, vehicles or other relevant objects. The skilled man will appreciate which features of an image are or are not salient. However, for the avoidance of any doubt, we cite that example of the applicants earlier International patent application published as WO9944173 which teaches one possible solution to the problem of determining salient features and its teaching is incorporated herein by reference.

The apparatus may further include a third data processing means—a perspective transform means—which is adapted to process the processed subset of data points to provide real world image points by mapping the corrected points onto a three dimensional map of the scene ahead of the vehicle.

Providing a three dimensional map from the corrected points allows further processing apparatus to determine the position of the or each salient feature in the real world, i.e. within the actual scene ahead of the vehicle.

The second data processing means may be arranged to apply one or more transforms which correct the identified image points for barrel distortion. This typically arises when less than perfect lenses are used in the formation of the captured image on a detector.

The transform may be based upon the following equations:

$$r' = k_0 r + k_1 r^3 + k_2 r^5$$

where r is a distance;
r' is the distorted position, which for any point is a function of the distance r from the centre of radial distortion; and
$k_0, k_1 \ldots$ are constants for a given form of distortion.
which can be approximated as:

$$r^1 = r + k r^3$$

The distorted position (x' and y') in the x and y directions of an image can be derived from the following two equations:

$$X' = C_x + (X - C_x)(1 + k r^2)$$

$$Y' = C_y + (Y - C_y)(1 + k r^2)$$

Where x and y are the coordinate axes of a 2-D system;
$C_x$ and $C_y$ are the coordinates of the centre of distortion;
X and Y are the actual coordinates of a point in a scene; and
X' and Y' are the distorted positions of the points in the image.

For negative values of k the barrel distortion will increase. For positive values it will decrease. For one value of k the effect will be minimized. The apparatus of the invention may employ a predetermined optimized value of k for use with the four equations to transform the points in the data subset. This value may be determined during initial manufacture, assembly or installation of the apparatus, and in particular the camera of the apparatus. The centre of distortion may also be provided within the apparatus, again either in manufacture, assembly or installation. For example, a known image with straight lines may be captured and processed using different centres of distortion and k values until the distortion is minimized. This may be an automated calibration.

The amount of shift that is to be applied to each data point under the transform may be determined using equations such as those presented hereinbefore and the resulting shifts stored in a map or look up table held in a memory of the apparatus. Then, when a point in a subset is to be shifted the required shift can be determined from the map or the look up table.

Two look up tables or maps may be provided, one for a Y-axis shift and the other for an X-axis shift. The amount of data that must be held in the memory to form these maps can be reduced by storing only every nth data point shift value and interpolating between the two closest points to provide the missing values. Interpolation has been found to provide good results for values of n up to 32 or thereabouts, although this will depend on the number of possible data points in the X-Y direction which depends on the camera performance.

The first and second data processing means may be embodied as a digital signal processing apparatus. In this case, the transform can be implemented in real time using a floating point processor. The values of k in the order of $1 \times 10^{-6}$ may be used.

The apparatus may determine a value of $r^2$ according to the following equation or an equation derived therefrom:

$$r^2 = (x - C_x)^2 + (y - C_y)^2$$

Of course, different types of distortion of the captured images may be additionally or alternatively corrected using the apparatus of the present invention. These will require the use of different transformations specific to the type of distortion that is to be corrected.

A camera may be provided which captures a digital image of the scene and produces a series of image frames. Each image frame may comprise a dataset as defined in the first aspect of the invention and this data set may be fed to the image processing apparatus.

The camera may comprise a camera which includes a detector that captures images in the visible or non/near visible (infrared) part of the spectrum such as a charge coupled device (CCD). The camera may include a lens which focuses the image of the scene onto the detector. The transform may then be tailored to match at least one distortion characteristic of the lens. This could be a transform whose parameters are tuned to a specific lens of a given camera.

The processed data subset, and optionally the real world image formed from it, may be passed to any known data processing apparatus which is configured to provide a set of warning or control signals for a vehicle control system such as lane departure warning system (LDW) or the like.

Sets of data points may be captured periodically, limited perhaps only by the refresh rate of the camera output. The processing performed by the apparatus may be carried out in real time, between each captured image data set. Again, because not all of the raw data is processed the amount of processing power needed, and hence cost, is kept low.

According to a second aspect the invention provides a method of determining the position of salient features within a scene in an image around a vehicle or the like comprising:

capturing a first dataset of digital data comprising a set of data points representative of an image of a scene ahead of the host vehicle, said image including at least one salient feature;

identifying a subset of the data points which correspond to the at least one salient feature; and applying a transformation to the subset of data points to produce a processed subset which corresponds to a digital image of the salient features in the scene that has been corrected for at least one type of distortion in the image.

The method may form part of a method of controlling a vehicle such as an automobile Lane Departure warning (LDW) system. In this case the method may comprise capturing images ahead of and/or to the side and/or to the rear of the vehicle which carries a camera.

According to a third aspect the invention provides a computer program comprising a set of program instructions which when running on a processor of a vehicle-mounted image processing apparatus which is arranged to receive signals from a vehicle mounted image capture device cause the apparatus to:

capture a first dataset of digital data comprising a set of data points representative of an image of a scene around the host vehicle as captured by the image capture device, said image including at least one salient feature;

identify a subset of the data points which correspond to the at least one salient feature; and apply a transformation to the subset of data points to produce a processed subset which corresponds to a digital image of the salient features in the scene that has been corrected for at least one type of distortion in the image.

The method may capture a data set which comprises a two dimensional array of digital data defined using an X-Y co-ordinate system. It may comprise a frame of image data output by the image capture device, which most conveniently may be a digital camera.

The program instructions may be provided in an area of non-volatile memory associated with the image capture apparatus. They may, alternatively, be distributed around a number of storage areas on a vehicle.

Other advantages of the invention will become apparent to those skilled in the art from the following detailed description of the preferred embodiments, when read in light of the accompanying drawings.

BRIEF DESCRIPTION OF THE DRAWINGS

FIGS. 7 to 12 illustrate examples of the corrected images obtained from the apparatus of FIG. 1 when the maps store only every nth required correction shift value for values of:

n=64, (no interpolation)

n=1, n=8, n=16, n=32 and n=64 (with interpolation).

DETAILED DESCRIPTION OF THE INVENTION

Figure 1:
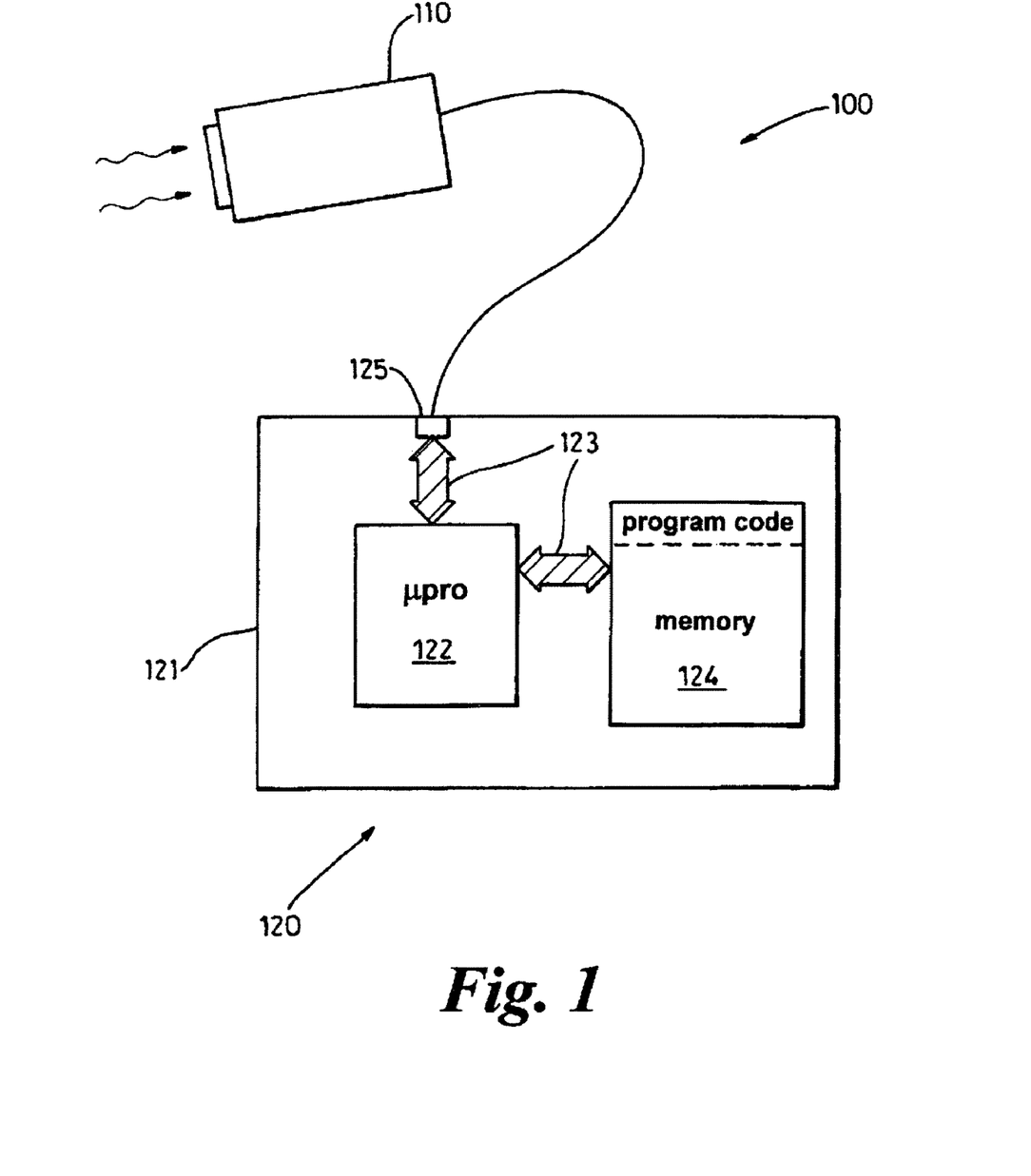
FIG. 1 is an apparatus for processing captured images for a vehicle in accordance with an embodiment of the present invention.

As shown in FIG. 1 of the accompanying drawings, an apparatus 100 for processing images captured from a sensing device fitted to a vehicle is provided. The apparatus comprises an image processing unit 120 which receives a digital feed from a camera 110 secured to a front of the vehicle and pointing forward of the vehicle (not shown). As such the camera 110 captures an image of a scene roughly corresponding to that which would be seen by a driver of the vehicle, including lane markings and obstacles such as other vehicles or pedestrians. The camera 110 typically captures many images in a sequence. The output of the camera therefore contains enough information to support a guidance system or lane boundary detection system to be provided.

Of course, this is only one arrangement and the camera could be mounted to view the side or the rear of the vehicle instead. The location of the camera will depend on the control system which is to be provided with image data. For example, a view to the rear could be fed to a parking/collision avoidance system. It should also be understood that the term vehicle is not intended to be limited to road vehicles.

As the apparatus 100 is intended to be fitted to a vehicle such as a passenger car the camera must be of a small size and is preferably of low cost. A typical camera 110 will comprise a detector array, such as a CCD array, located behind a focussing lens. The array comprises a two dimensional grid of detectors which are sensitive to light.

Figure 2:
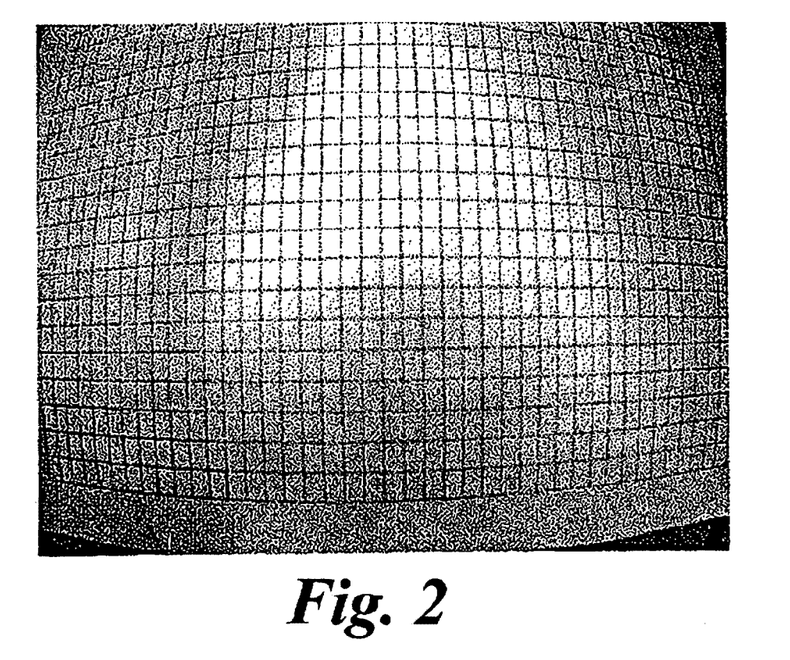
FIG. 2 is an example of a regular sample grid as seen by a camera with a lens that exhibits barrel distortion.

In most cases it is envisaged that the image formed on the array will be distorted. This could be prevented by using an expensive camera with a perfect imaging lens but this would add unneeded expense. The most common type of distortion is known as barrel distortion. An example of this is shown in FIG. 2 of the accompanying drawings which shows how a regular grid looks when captured by a camera exhibiting barrel distortion. If the camera was perfect the grid would appear to have straight lines, but they are in fact curved.

Figure 3:
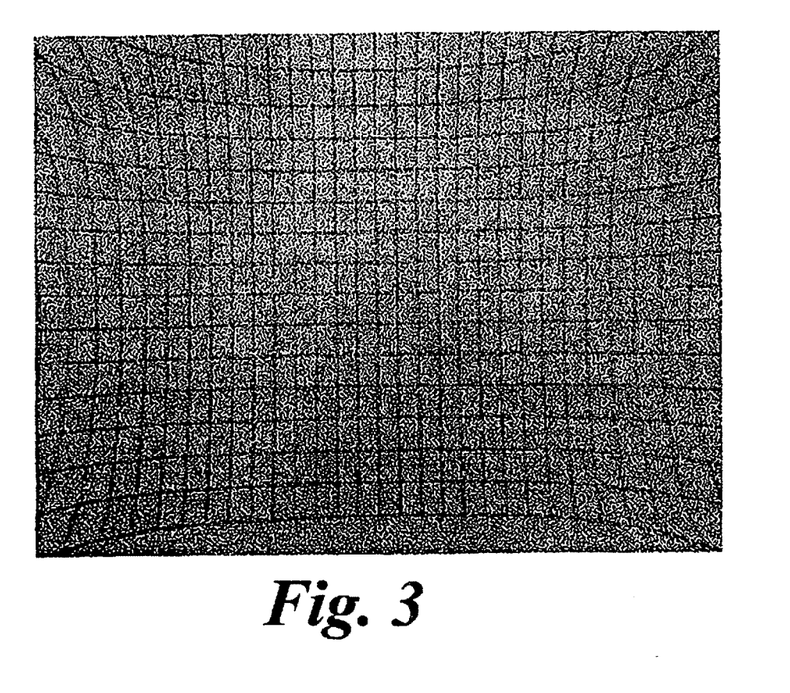
FIG. 3 is an example of the same regular sample grid as seen by a camera with a lens that exhibits pin-cushion distortion.

Another type of distortion is known as pin-cushion distortion and this can be seen in FIG. 3 of the accompanying drawings. Both are examples of what is known as radial distortion. The distorted distance is a function of how far the points in the image are from the centre of radial distortion which is typically, but not always, the centre of the image.

As shown in FIG. 1 the image processing circuit 120 comprises a signal processing board 121 which carries a processor 122 and a signal bus 123 that connects the processor 122 to an area of memory 124 and to an input buffer 125 which can be connected to a feed from the camera 110. The memory 124 consists of an area of non-volatile read only memory, such as FPGA, and which may store program instructions which consist of blocks of program code that cause the processor to perform a range of different functions. It may also comprise an area of volatile memory to which data can be stored temporarily. Such memory may be application specific. Two connectors permit power to be fed to the circuit board and for an earth connection to be provided respectively.

Figure 4:
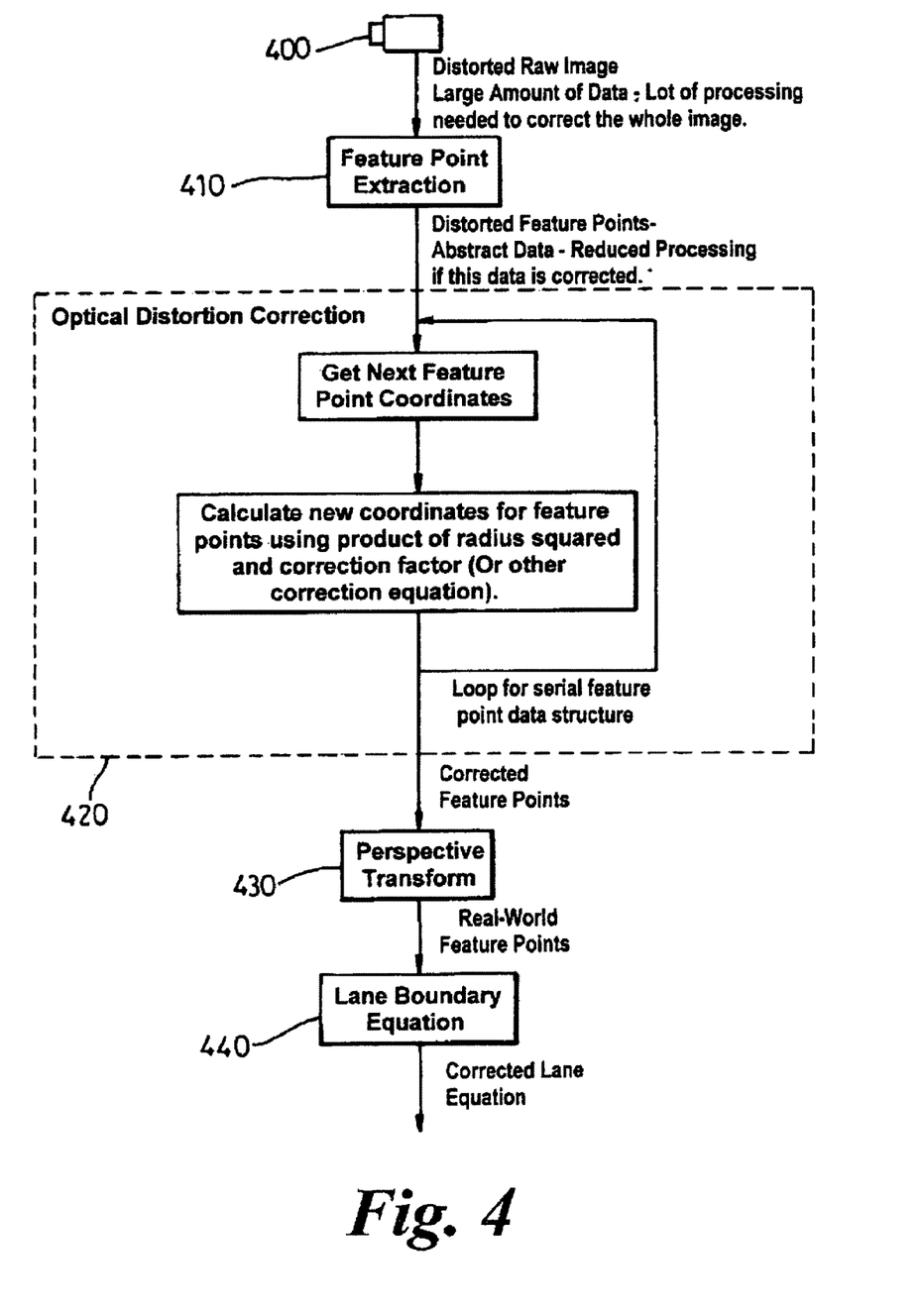
FIG. 4 is a block diagram showing the steps performed by the apparatus when carrying out an embodiment of the second aspect of the invention.

The method of operation of the apparatus 100 when the functions implemented by the program is executed is set out in the flow diagram of FIG. 4 of the accompanying drawings.

In a first step 400, the camera captures an image focused on the CCD device by the lens. The device produces a raw data set of image points 400, each of which has a value dependent upon the reaction of pixel in the CCD device to light focused on it by the lens. In a simple device for capturing black and white images the magnitude of the output of each pixel will generally increase with the intensity of light falling upon it. The data set will therefore comprise a two dimensional array of values which correspond to each element in the array and together make up an image of the scene as presented by the lens. Each point in the subset comprises an X-Y coordinate indicating its spatial position in the image and an intensity value.

Whenever a data set is captured it is fed across the bus 123 to an input of the image processor and may be stored temporarily in the area of the memory 124.

Once stored the processing apparatus accesses the data set and proceeds to process 410 the data points so as to determine which points correspond to salient features in the focussed image. Those which are identified are extracted and stored in another area of memory to form a subset of data. This will include less data points than the original captured data set but importantly the position of each data point within the image is preserved by keeping the same X-Y reference co-ordinates for the points in the subset as used for the captured image.

In the next step 420, the points in the subset are processed by applying a transform to the points which removes the effects of distortion of the captured image. In this example, barrel distortion introduced by the lens is removed.

Figure 5:
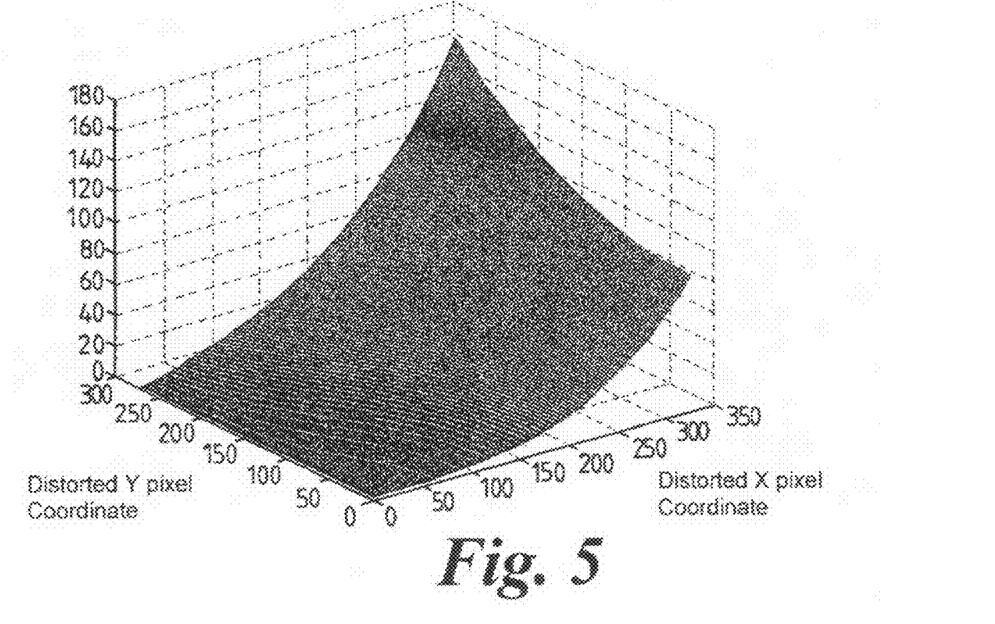
FIG. 5 is a look up table or map of position shifts required to compensate for barrel distortion in the X-direction for the apparatus of FIG. 1.
Figure 6:
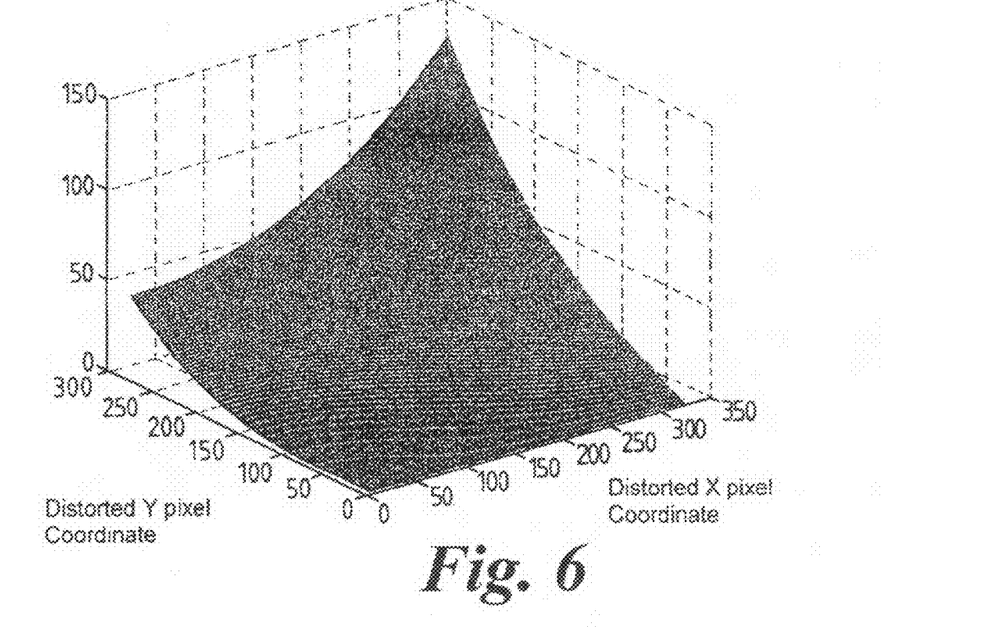
FIG. 6 is a look up table or map of position shifts required to compensate for barrel distortion in the Y-direction for the apparatus of FIG. 1.
Figure 7:
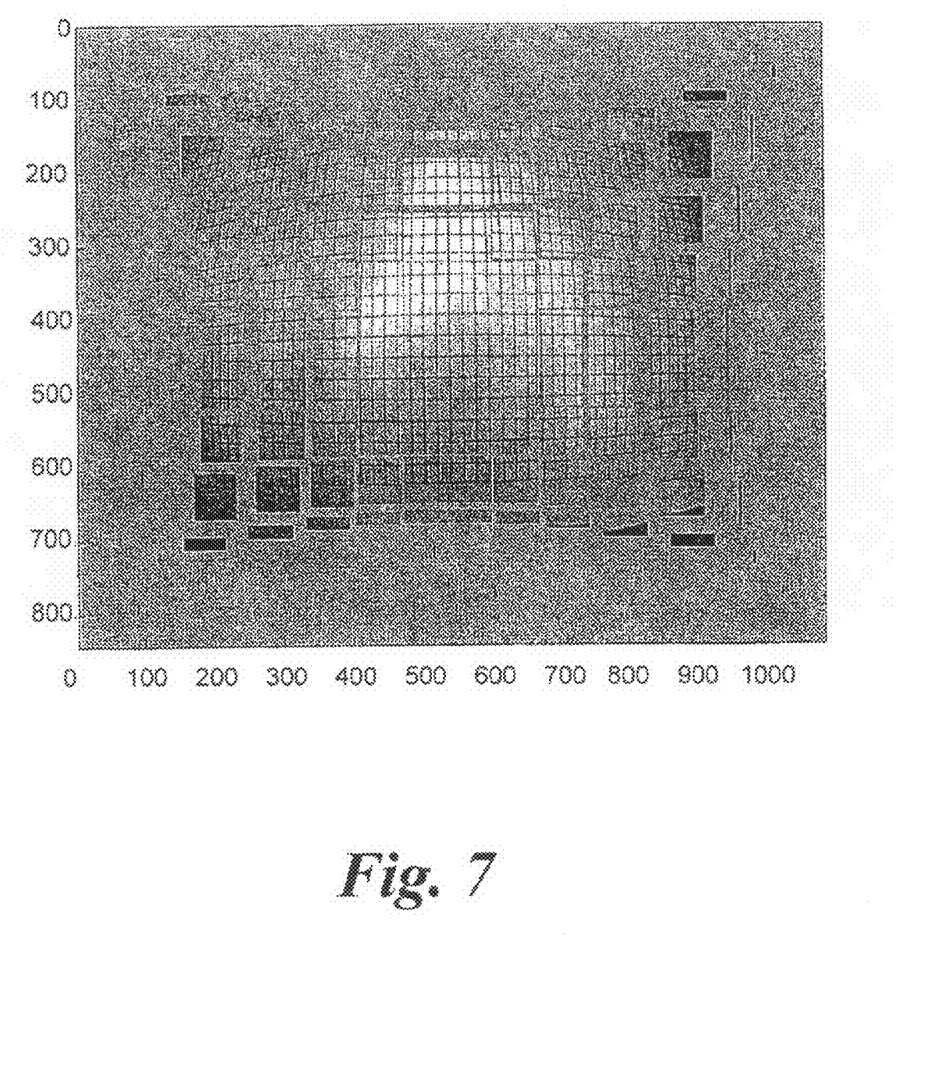
Figure 8:
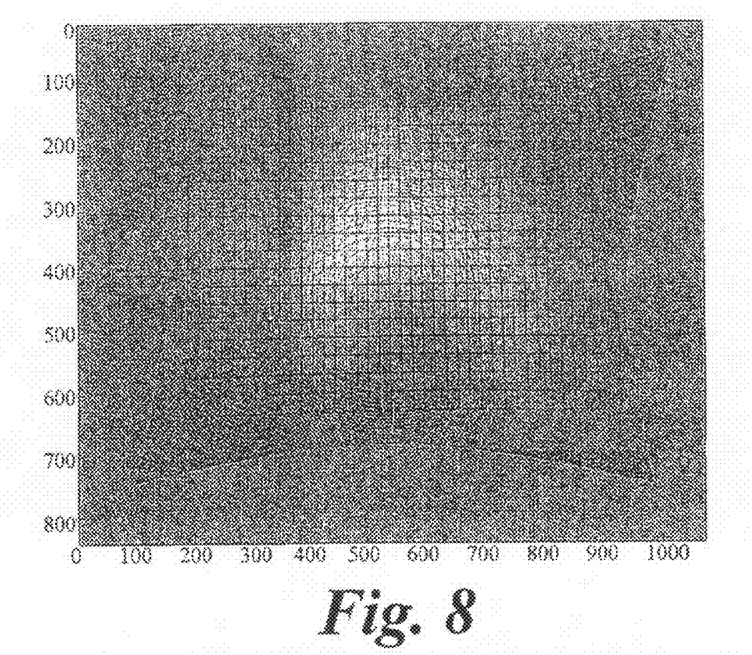
Figure 9:
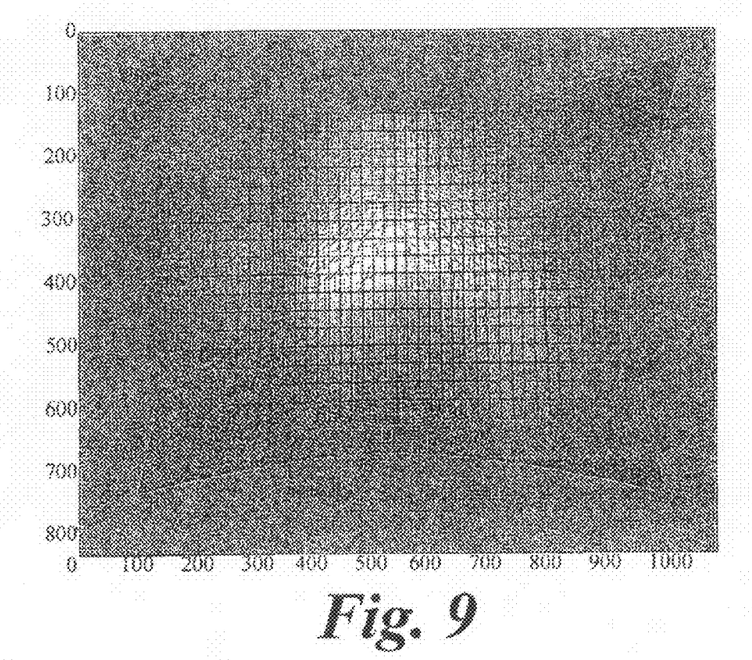
Figure 10:
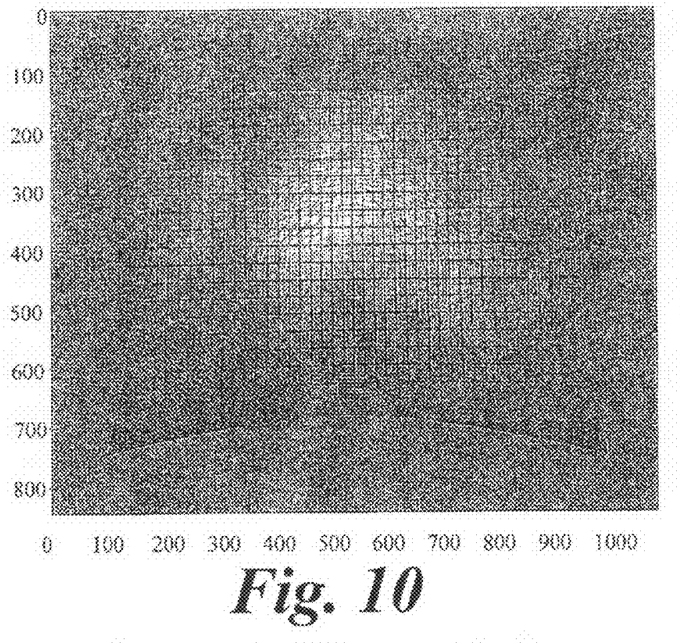
Figure 11:
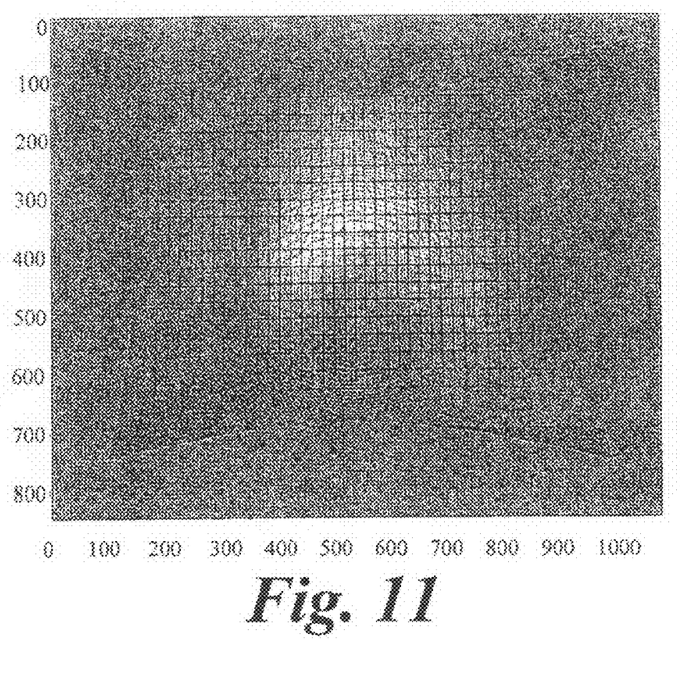
Figure 12:
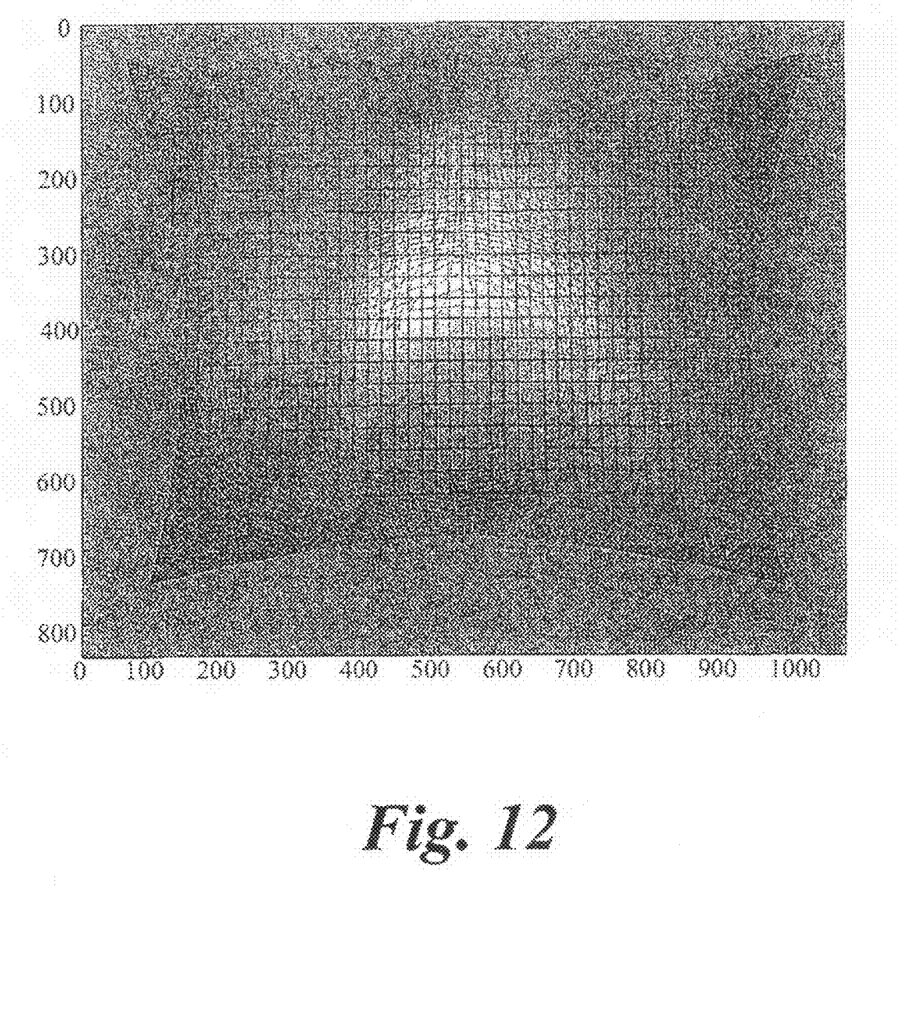

To remove the distortion, the transform is applied to the X-Y coordinates of each point in the subset. As such, each point will be moved by an amount equal to the amount of distortion caused by the lens. The transformation is performed may be performed using a floating point method or using an integer based method. A suitable integer based method may be centred around the use of two look up tables which indicate the amount of shift in the X and Y axes respectively that is needed for each point in the subset. An example of two such look up tables is provided in FIGS. 5 and 6 of the accompanying drawings. They may be tuned using a test sample such as the regular sample grid shown in the captured images of FIGS. 2 and 3.

The look up tables, which are stored in the memory, may be generated using the function provided in Appendix A. This is an example of a suitable computer program written in the C language which when executed by the processor provides the required data for the look up tables. The function includes a third term K2 in the distortion equation for more accurate correction. Since the table is generated off line, during manufacture, assembly or installation, the processing overheads of the extra complexity of this term are irrelevant and do not effect the performance of the apparatus in use. The term IndexDiv is a table reduction factor which reduces the size of the table. Appendix B is a similar block of code written in C which provides the function needed to perform the transform using the tables.

Appendix C is a further block of computer program code relating to the use of the function of Appendix B in correcting the distortion in the subset of data points.

Once each point in the subset has been processed in this way the new set is again stored temporarily in the memory as a processed subset. To demonstrate the effectiveness of the transform the block of program code provided in Appendix D may be executed which provides a set of corrected images formed from the data in a processed subset in which each of the lines of the sample grid is assumed to be a salient feature (such that all points on the lines fall into the subset). FIGS. 7,8,9,10 and 11 show the results of executing this code with the tables of FIGS. 5 and 6 of the accompanying drawings for different values of n of n=64 (without interpolation), n=1, n-8, n=16, n=32 and n=64 (all with interpolation).

Of course, in a practical device the images need not be produced. Instead, the points in the processed subset, which in effect represents an image of the scene in which only salient features are present and from which distortion has been removed, are further transformed 430 into the real world using a perspective transform. Finally, they may be processed 440 to identify lane boundaries or obstacles or the like using known processing routines and to see whether they represent obstacles to the vehicle.

The processing steps may be performed in real time with new data sets being captured at periodic intervals. The rate of capture may be limited only by the capture rate of the camera provided that the processing can be performed at a sufficient rate to keep with the rate at which it is presented with data sets. As the invention reduces the amount of processing to reduce distortion and perform perspective transforms to the salient data points only, a good reduction in the amount of processing compared with processing all the raw data can be obtained.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

APPENDIX A

```
function [ShiftTableX,ShiftTableY] =
LookupGen(ImgWidth,ImgHeight,Cx,Cy,k1,k2,IndexDiv)
% Calculate Table dimensions which will cover image area with distortion
%centre offset with no reduction factor
TableWidth = ceil((ImgWidth/2) + abs(Cx − ImgWidth/2))+1;
TableHeight = ceil((ImgHeight/2) + abs(Cy − ImgHeight/2))+1;
% Calculate the number of x and y elements in the table for the given
% reduction factor
TableWidth = ceil(TableWidth/IndexDiv);
TableHeight = ceil(TableHeight/IndexDiv);
for xIndex = [0:TableWidth]
    for yIndex = [0:TableHeight]
        x = xIndex * IndexDiv;
        y = yIndex * IndexDiv;
        rSquared = x*x + y*y;
        ShiftTableX(yIndex+1,xIndex+1) =
            round(x * (k1 * rSquared + k2 * rSquared *rSquared));
        ShiftTableY(yIndex+1,xIndex+1) =
            round(y * (k1 * rSquared + k2 * rSquared *rSquared));
    end
end
```

APPENDIX B

```
function [CorrectedImg] =
ImageCorrect(DistortedImg,XTable,YTable,Cx,Cy,IndexDiv)
ImgSize = size(DistortedImg);
XOffset = max(max(XTable));
YOffset = max(max(YTable));
Correctedwidth = ImgSize(2) + 2*XOffset;
CorrectedHeight = ImgSize(1) + 2*YOffset;
CorrectedImg = ones(CorrectedHeight,Correctedwidth)*200;
for x = [0:ImgSize(2) −1]
    for y = [0:ImgSize(1) −1]
        XShift = XTable(abs(y−Cy)+1,abs(x−Cx)+1);
        YShift = YTable(abs(y−Cy)+1,abs(x−Cx)+1);
        if (x < Cx)
            XShift = −1 * XShift;
```

APPENDIX B-continued

```
        end
        if (y < Cy)
            YShift = −1 * YShift;
        end
        CorrectedImg(YOffset+y+YShift+1,XOffset+x+XShift+1) =
            DistortedImg(y+1,x+1);
    end
end
```

APPENDIX C

```
function [CorrectedImg] =
ImageCorrect(DistortedImg,XTable,YTable,Cx,Cy,IndexDiv)
ImgSize = size(DistortedImg);
XOffset = max(max(XTable));
YOffset = max(max(YTable));
CorrectedWidth = ImgSize(2) + 2*XOffset;
CorrectedHeight = ImgSize(1) + 2*YOffset;
CorrectedImg = ones(CorrectedHeight,CorrectedWidth)*200;
for x = [0:ImgSize(2)−1]
    for y = [0:ImgSize(1)−1]
        XLowerIndex = floor(abs(x−Cx)/IndexDiv);
        XUpperIndex = XLowerIndex + 1;
        YLowerIndex = floor(abs(y−Cy)/IndexDiv);
        YUpperIndex = YLowerIndex + 1;
        A = XTable(YLowerIndex+1,XLowerIndex+1);
        C = XTable(YLowerIndex+1,XUpperIndex+1);
        B = XTable(YUpperIndex+1,XLowerIndex+1);
        D = XTable(YUpperIndex+1,XUpperIndex+1);
        XShift1 = A + (C−A) * (mod(abs(x−Cx),IndexDiv)/IndexDiv);
        XShift2 = B + (D−B) * (mod(abs(x−Cx),IndexDiv)/IndexDiv);
        XShift = round(XShift1 + (XShift2 − XShift1) *
            (mod(abs(y−Cy),IndexDiv)/IndexDiv));
        A = YTable(YLowerIndex+1,XLowerIndex+1);
        B = YTable(YLowerIndex+1,XUpperIndex+1);
        C = YTable(YUpperIndcx+1,XLowerIndex+1);
        D = YTable(YUpperIndex+1,XUpperIndcx+1);
        YShift1 = A + (C−A) * (mod(abs(y−Cy),IndexDiv)/IndexDiv);
        YShift2 = B + (D-B) * (mod(abs(y−Cy),IndexDiv)/IndexDiv);
        YShift = round(YShift1 + (YShift2 − YShift1) *
            (mod(abs(x−Cx),IndexDiv)/IndexDiv));
        if (x < Cx)
            XShift = −1 * XShift;
        end
        if (y < Cy)
            YShift = −1 * YShift;
        end
        CorrectedImg(YOffset+y+YShift+1,XOffset+x+XShift+1) =
            DistortedImg(y+1,x+1);
    end
end
```

APPENDIX D

```
Img = imread('AEVideoSensor3.bmp','bmp');
ImgSize = size(Img);
figure(1);colormap((transpose([0:0.003922:1]) * ones(1,3)));image(Img);
[xtable,ytable] = LookupGen(ImgSize(2),ImgSize(1),ImgSize(2)/2 − 5,ImgSize(1)/2 + 30,2e−6,5e−12,1);
CorrectedImg = ImageCorrect(Img,xtable,ytable,ImgSize(2)/2 − 5,ImgSize(1)/2 + 30,1);
figure(2);colormap((transpose([0:0.003922:1]) * ones(1,3)));image(CorrectedImg);xlim([01083]);ylim([0 843]);
[xtable8,ytable8] = LookupGen(ImgSize(2),ImgSize(1),ImgSize(2)/2 − 5,ImgSize(1)/2 + 30,2e−6,5e−12,8);
CorrectedImg8 = ImageCorrect(Img,xtable8.ytable8,ImgSize(2)/2 − 5,ImgSize(1)/2 + 30.8);
figure(3);colormap((transpose([0:0.003922:1]) * ones(1,3)));image(CorrectedImg8);xlim([01083]);ylim([0 843]);
[xtable16,ytable16] = LookupGen(imgSize(2),ImgSize(1),ImgSize(2)/2 − 5,ImgSize(1)/2 + 30,2e−6,5e−12,16);
CorrectedImg16 = ImageCorrect(Img,xtable16,ytable16,ImgSize(2)/2 − 5,ImgSize(1)/2 + 30,16);
figure(4);colormap((transpose([0:0.003922:1]) * ones(1,3)));image(CorrectedImg16);xlim([0 1083]);ylim([0 843]);
[xtable32,ytable32] = LookupGen(ImgSize(2),ImgSize(1),ImgSize(2)/2 − 5,ImgSize(1)/2 + 30,2e−6,5e−12,32);
CorrectedImg32 = ImageCorrect(Img,xtable32,ytable32,ImgSize(2)/2 − 5,ImgSize(1)/2 + 30,32);
figure(5);colormap((transpose([0:0.003922:1]) * ones(1.3)));image(CorrectedImg32);xlim([0 1083]);ylim([0 843]);
```

The invention claimed is:

1. A sensing apparatus for a host vehicle comprising:
sensing means arranged to capture a first dataset of digital data comprising a set of data points representative of an image of a scene around the host vehicle, said image including at least one salient feature;
first data processing means arranged to identify a subset of said data points which correspond only to said at least one salient feature; and
second data processing means arranged to apply a transformation to said subset of data points to produce a processed subset which corresponds to a digital image of said salient features in said scene that has been corrected for at least one type of distortion in said image.

2. Apparatus according to claim 1 wherein the apparatus is included in a lane detection apparatus.

3. Apparatus according to claim 1 which is adapted to produce a subset of data points which only correspond to salient features and nothing else.

4. Apparatus according to claim 1 which further includes a third data processing means which is adapted to further process said processed subset of data points to provide real world image points by mapping said further processed points onto a three dimensional map of said scene around said vehicle.

5. Apparatus according to claim 1 in which said second data processing means is arranged to apply at least one transform which corrects said identified image points for barrel distortion.

6. A method of determining the position of salient features within a scene in an image around a host vehicle comprising:

(a) capturing a first dataset of digital data comprising a set of data points representative of an image of a scene ahead of said host vehicle, said image including at least one salient feature;
(b) identifying a subset of said data points which correspond only to said at least one salient feature; and
(c) applying a transformation to said subset of data points to produce a processed subset which corresponds to a digital image of said at least one salient feature in said scene that has been corrected for at least one type of distortion in said image.

7. A non-transitory computer readable medium comprising a set of program instructions which, when running on a processor of a vehicle-mounted image processing apparatus that is arranged to receive signals from a host vehicle mounted image capture device, cause said apparatus to:

(a) capture a first dataset of digital data comprising a set of data points representative of an image of a scene around said host vehicle as captured by said image capture device, said image including at least one salient feature;
(b) identify a subset of said data points which correspond to only said at least one salient feature; and
(c) apply a transformation to said subset of data points to produce a processed subset of data points which corresponds to a digital image of said at least one salient features in said scene that has been corrected for at least one type of distortion in said image.

* * * * *

UNITED STATES PATENT AND TRADEMARK OFFICE
CERTIFICATE OF CORRECTION

PATENT NO. : 8,044,998 B2
APPLICATION NO. : 11/786771
DATED : October 25, 2011
INVENTOR(S) : Adam John Heenan Page 1 of 1

It is certified that error appears in the above-identified patent and that said Letters Patent is hereby corrected as shown below:

Title Page, Please insert:

--(30)   Foreign Application Priority Data

October 12, 2004    (GB)............................0422585.0--

Signed and Sealed this

Thirteenth Day of December, 2011

David J. Kappos
*Director of the United States Patent and Trademark Office*